United States Patent [19]
Shaw et al.

[11] Patent Number: 5,246,131
[45] Date of Patent: Sep. 21, 1993

[54] POSITIVE LIFT PIN FOR AIRCRAFT DRAIN VALVE

[75] Inventors: James R. Shaw, Amagansett; James Cline, East Hampton, both of N.Y.

[73] Assignee: Shaw Aero Devices, Inc., Wainscott, N.Y.

[21] Appl. No.: 950,988

[22] Filed: Sep. 22, 1992

Related U.S. Application Data

[63] Continuation of Ser. No. 604,831, Oct. 29, 1990, abandoned.

[51] Int. Cl.⁵ .................................................. B65D 43/26
[52] U.S. Cl. ........................................ 220/264; 220/263; 220/315; 220/335; 292/254; 292/DIG. 72
[58] Field of Search ............... 220/256, 259, 260, 262, 220/263, 264, 315, 335; 292/254, DIG. 72

[56] References Cited

U.S. PATENT DOCUMENTS

| | | | |
|---|---|---|---|
| 748,178 | 12/1903 | Edwards | 292/DIG. 72 X |
| 930,906 | 8/1909 | Miner | |
| 1,102,220 | 6/1914 | Ahlstrom | 292/DIG. 72 X |
| 1,102,221 | 6/1914 | Whitford et al. | 292/DIG. 72 X |
| 1,217,197 | 2/1917 | McNally | 292/DIG. 72 X |
| 1,536,110 | 5/1925 | Lewis | |
| 1,657,423 | 1/1928 | Van Duzer | |
| 1,776,599 | 9/1930 | Schmidt et al. | |
| 2,218,183 | 10/1940 | Springer | |
| 3,666,135 | 5/1972 | Kindle | 220/263 X |
| 3,801,146 | 4/1974 | Donath et al. | 292/DIG. 72 X |
| 3,912,311 | 10/1975 | Carvell et al. | |
| 3,980,111 | 9/1976 | Badger | 220/259 X |
| 4,098,427 | 7/1978 | Duckworth, Jr. | 220/259 |
| 4,127,215 | 11/1978 | Morrison | 220/314 |
| 4,690,296 | 9/1987 | Elliott | 220/259 |
| 4,693,389 | 9/1987 | Kalen | 220/236 |
| 4,799,503 | 1/1989 | Tahara | 220/260 |
| 4,799,604 | 1/1989 | Okojima et al. | 220/260 |
| 4,809,868 | 3/1989 | Pomroy | 220/260 |

FOREIGN PATENT DOCUMENTS

| | | | |
|---|---|---|---|
| 748434 | 4/1944 | Fed. Rep. of Germany | 220/264 |
| 404258 | 11/1909 | France | 220/260 |
| 1367132 | 12/1964 | France | 220/315 |
| 406811 | 3/1934 | United Kingdom | 292/DIG. 72 |
| 795122 | 5/1958 | United Kingdom | 292/DIG. 72 |

Primary Examiner—Allan N. Shoap
Assistant Examiner—Stephen Cronin
Attorney, Agent, or Firm—Pennie & Edmonds

[57] ABSTRACT

A positive lift pin means is provided which operates to force open an aircraft drain valve door at least to an unsealed position when the door is released from its closed position.

16 Claims, 1 Drawing Sheet

POSITIVE LIFT PIN FOR AIRCRAFT DRAIN VALVE

This is a continuation, of application Ser. No. 07/604,831, filed Oct. 29, 1990, now abandoned.

FIELD OF THE INVENTION

This invention pertains to liquid valve seals, particularly those used for sealing aircraft lavatory drain ports.

BACKGROUND OF THE INVENTION

Waste from aircraft lavatories is generally collected in a holding tank during flight, and removed after landing using airport facilities. A drain port is therefore provided on the aircraft fuselage for emptying the contents of the holding tank. When the tank is to be emptied, a device is placed over the port and the valve is opened for emptying the waste. The waste may be allowed to flow out of the tank under the force of gravity alone, or suction may be used to draw the waste from the tank.

A number of valve designs exist for such drain ports. One design which is particularly suitable for use with the present invention is disclosed in U.S. Pat. No. 4,098,427 ("the '427 patent") to Duckworth, which is incorporated herein by reference. A double sealing, two-door valve is shown there, with an inner door and an outer door enclosing the inner door.

Another typical design used for these applications employs a plug for sealing the port, in combination with a single door for providing a second seal outside the plug.

A particular concern of aircraft drain valves in general is to provide an adequate seal to prevent leakage. Because of the extremely cold temperatures at high altitudes, any liquid which leaks through a seal quickly freezes. The frozen material which thus forms can break off in flight, and constitutes a hazard to the aircraft. Another problem with the frozen material is that it jams the drain port valves shut so that they do not properly open when the waste holding tank is to be emptied after landing.

A similar problem affecting some drain port valves involves a build-up of residue in the area of the valve seal, which may occur if the valves are not attentively maintained. This residue can cause the valve door to stick in the closed position, making opening of the door more difficult.

It is therefore an object of this invention to provide a means for ensuring that drain port valves open regardless of whether leakage and freezing of waste material has occurred.

It is a further object of this invention to provide such a means which may be easily adapted to existing designs of drain port valves.

SUMMARY OF THE INVENTION

According to the present invention, positive lift pin means is provided for opening the sealing door of an aircraft lavatory drain port valve. The lift pin means is operatively associated with the conventional door release mechanism and forces the door to at least an unsealed position when the door release is activated.

The lift pin means forces the door partially open, breaking any frozen waste material which may have accumulated in the area of the seal, and assuring opening of the door. This invention may therefore be used on any device having a pivoting door which is subject to freezing conditions, particularly where a liquid valve seal is provided, and most specifically in the field of aircraft lavatory waste drain valves.

DETAILED DESCRIPTION OF THE PREFERRED EMBODIMENTS

Figure 1:
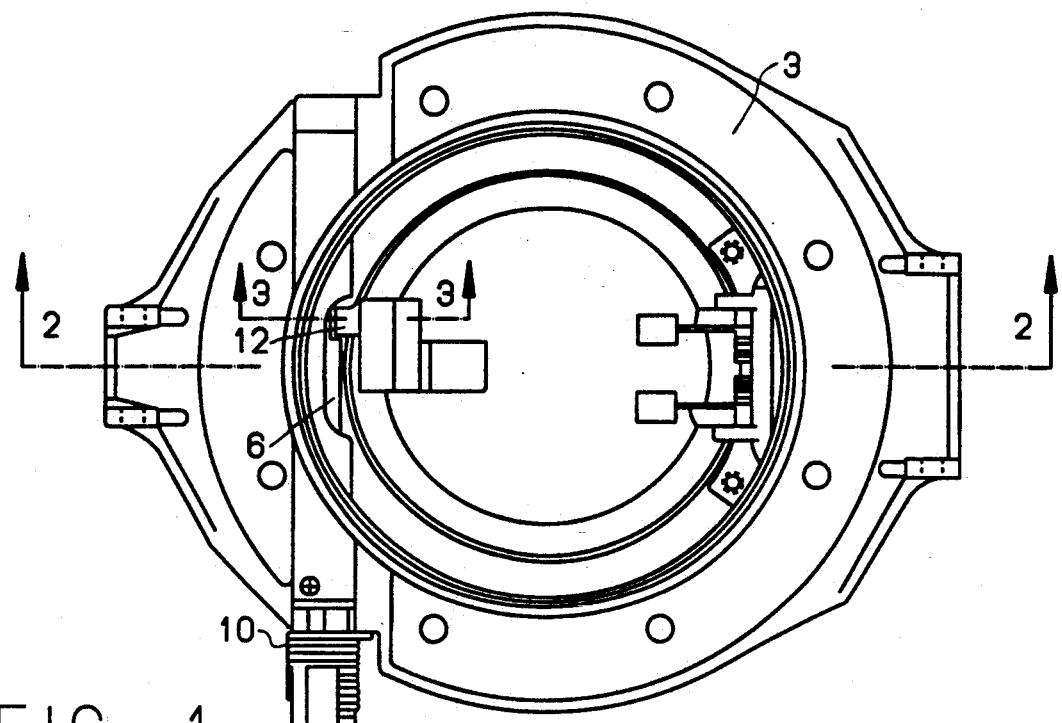
FIG. 1 is a top view of the invention used in a drain valve.
Figure 2:
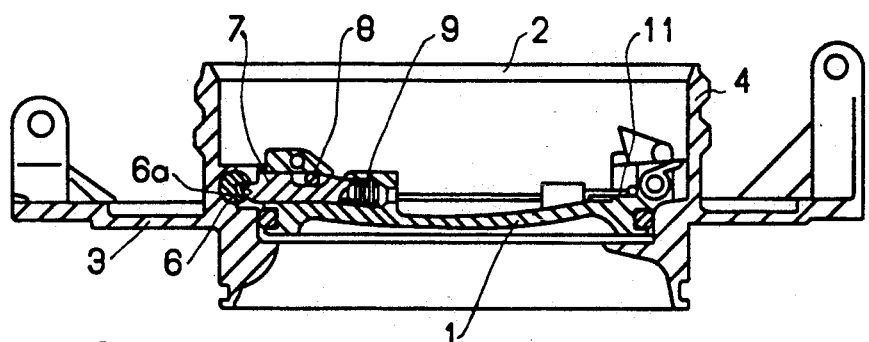
FIG. 2 is a cross-sectional view of the drain valve of FIG. 1, along lines 2—2 of FIG. 1, showing the door securing means of the drain valve.

The present invention is particularly useful in aircraft lavatory drain port valves of the type shown in FIGS. 1 and 2. The drain port valve shown there has an inner door 1 and an outer door 2. These doors are pivotally connected to mounting member 3, which has a raised collar portion 4 and which is adapted for engagement to a waste drain port on the fuselage of an aircraft. Inner door 1 is engaged to an inner portion of mounting member 3, while the outer door 2 is engaged to the end of collar portion 4. The inner door therefore provides a first sealing means against flow of liquid from the waste liquid collection tank of the aircraft. The outer door encloses the inner door to provide a second sealing means.

Because the first door constitutes the immediate line of protection against flow of liquid waste, it is vulnerable to the effects of contact with the liquid. Although the doors prevent the liquid from actually exiting the aircraft, the liquid can still create difficulties by causing the inner door to become frozen shut when liquid contacting the door and seal freezes. Greater force must be exerted by the door opening means in such a case, to overcome the frozen condition and open the door. It is therefore desirable to provide a mechanism for assuring the opening of the inner door when the liquid is to be discharged.

The inner door has securing means, shown in FIG. 2, comprising a grooved shaft 6 having a securing/release and opening groove defined by a first groove 6a and second groove 6b, respectively, a securing or latch pin mans or member in the form of a spring-loaded pin catch 7, a roll pin 8 for pin catch 7, and spring 9. Pin catch 7, roll pin 8, and spring 9 all are mounted on the inner door, while grooved shaft 6 is rotatably mounted on mounting member 3. Spring 9 forces pin catch 7 into shaft 6, while roll pin 8 limits the range along which pin catch 7 moves. Pin catch 7 is operatively associated with grooved shaft 6 so that pin catch 7 engages the grooved surface of a shaft defined by the groove 6a when the inner door is closed, latching the door in the closed position.

Shaft 6 is itself spring-loaded with spring 10 shown in FIG. 1, in order to normally position the shaft for latching engagement between its groove 6a and pin catch 7. The inner door is opened by rotating shaft 6 against the force of spring 10, which moves the groove 6a of shaft 6 in a direction counterclockwise to the view of FIG. 2. When the grooved shaft 6 has rotated far enough, pin catch 7 disengages from the groove 6a of shaft 6 and the door is released.

In order to effectuate opening of the door in response to the rotation of shaft 6 and disengagement of pin catch 7, inner door 1 is spring-loaded with spring 11, which acts to force rotation of the inner door toward an open position. Ideally, the force provided by spring 11 would be sufficient to "pop" the inner door open when pin catch 7 cleared the groove 6a of shaft 6. Due to aforementioned freezing complications, however, this is not always possible.

Figure 3:
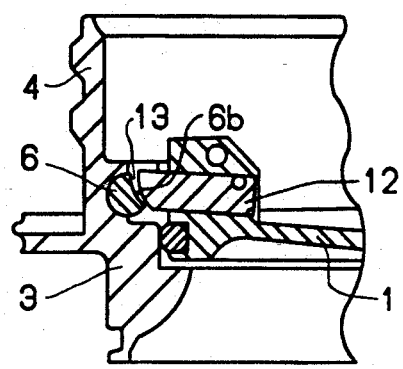
FIG. 3 is a cross-sectional view of the drain valve of FIG. 1, along lines 3—3 of FIG. 1, showing the positive lift pin means of the invention.

To solve the valve-opening problems associated with freezing, the present invention provides a positive lift pin means or member 12, shown in FIGS. 1 and 3, which forces inner door 1 at least to an unsealed position when the door is released from its securing means. Lift pin means 12 is operatively associated with shaft 6 by the provision in shaft 6 of a groove 6b and associated clearance slot 13, in which lift pin means 12 rests when inner door 1 is closed. Lift pin means 12 is engaged to inner door 1, as shown in FIG. 3, and when shaft 6 is rotated to release the door, clearance slot 13 is closed and the surface of the shaft 6 define by the groove 6b forced against lift pin means 12. This in turn forces lift pin means 12 to move upward, thus causing inner door 1 to open at least a given amount and break free of any freezing condition.

The distance which the door is forced to open depends on the specific design of the door, lift pin, clearance slot and shaft. A preferred embodiment of this invention achieves a minimum clearance of approximately 0.13" in the area of the lift pin means. One skilled in the art can best select or determine the appropriate clearance for any particular application by routine testing.

Although the present invention is used on the inner door of a double door valve according to the preferred embodiment discussed above, the invention may be applied in other embodiments of such valves. For examples, the outer door may be fitted with positive lift pin means, in addition to the inner door. Alternatively, the lift pin means may be used in conjunction with valves of different designs, e.g., those having a single door combined with a plug.

We claim:

1. A cap assembly comprising:
   a first sealing door which pivots between an open position and a closed sealed position;
   first door securing means for securing the first door in the closed sealed position, said first door securing means comprising a shaft with a shaft surface and a latch pin member operatively associated therewith;
   means for releasing said first door securing means to allow movement of said first door to the open position;
   means separate from said securing means for positively opening said first door at least to an unsealed position when said releasing means releases said first door securing means, said first door opening means comprising a lift pin member, said lift pin member being connected to said first door and extending beyond an edge of said door; and
   a groove located on said first door securing means shaft, said groove operatively associated with said lift pin member and latch pin member such that rotation of said shaft causes said groove to release said latch pin member and to forcibly move said lift pin member to positively open and unseal said first door.

2. A cap assembly, comprising:
   a first sealing door which pivots between an open position and a closed sealing position;
   first door securing means comprising a shaft and a latch pin member operatively associated therewith for securing the first door in the closed sealed position;
   means for releasing said first door securing means, comprising a groove located on said shaft; and
   lift pin mans for positively opening said first door at least to an unsealed position when said releasing means releases said first door securing means, wherein said groove is operatively associated with said lift pin means and latch pin member such that rotation of said shaft caused said groove to release said latch pin member and to forcibly move said lift pin means to positively open and unseal said first door.

3. The cap assembly of claim 2, further comprising a second sealing door which pivots between an open position and a closed sealing position, said second door located to sealingly enclose said first door when said second door is in the closed sealing position.

4. A cap assembly comprising:
   a first sealing door which pivots between an open position and a closed sealed position;
   first door securing means for securing the first door in the closed sealed position;
   positive lift pin means for opening said first door at least to an unsealed position when said first door securing means releases said first door from said closed sealed position, wherein said lift pin means comprises an outwardly extending pin member secured to the first door and extending beyond the periphery of the door;
   a second sealing door which pivots between an open position and a closed sealing position, said second door enclosing said first door when said second door is in the closed sealing position; and
   second door securing means for securing the second door in the closed sealing position.

5. The cap assembly of claim 4, wherein said positive lift pin means is operatively associated with said first door securing means, said first door securing means moves from a first position when said first door is closed to a second position for releasing said first door, and said positive lift pin means is arranged to be forcibly contacted by said first door securing means when said first door securing means moves from said first position to said second position.

6. The cap assembly of claim 5, wherein said first door securing means comprises a spring-loaded shaft having a groove and a clearance slot, and a spring-loaded pin catch connected to said first door which engages said groove and holds the first door in the closed sealing position when said shaft is in said first position, and which disengages said groove when said shaft moves form said first position to a second position, and wherein said positive lift pin means rests with said clearance slot when said shaft is in said first position and is forcibly contacted by said groove said shaft moves from said first position to said second position.

7. The cap assembly of claim 5, wherein said positive lift pin means moves said first door form a first position to a second position in response to said forcible contact by said first door securing means, and wherein the distance between the first position of said first door and the second position of said first door, in the area of said positive lift pin means, is approximately 0.13 inches.

8. A cap assembly for sealing aircraft lavatory drain ports, comprising:
   a door for sealing the port in a closed position and said door pivoting outwardly to an open position;
   a rotatable shaft adjacent to the door, said shaft defining two longitudinally spaced grooves wherein one groove opens outwardly with respect to a predetermined radius of said shaft and one groove is closed outwardly with respect to said radius;
   a securing pin mounted on the door and received in the outwardly closed groove when the door is in the closed position; and
   a lift pin mounted on the door and received in the outwardly open groove when the door is in the closed position such that rotation of the shaft caused the shaft to engage the lift pin and force the door outward toward the open position.

9. A cap assembly comprising:
   a first sealing door which pivots between an open position and a closed sealed position;
   first door securing means for securing the first door int eh closed sealed position, said first door securing means comprising a rotatable shaft having a shaft surface and a latch pin member operatively associated therewith with said shaft surface engaging with said latch pin member in one position of said shaft when said door is in said closed sealed position;
   means for releasing said first door securing means to allow movement of said first door to the open position;
   means separate from said securing means for positively opening said first door at least to an unsealed position when said releasing means releases said first door securing means, said first door opening means comprising a lift pin member;
   said releasing and opening mans further comprising a groove located on said first door securing means shaft, said groove operatively associated with said lift pin member and latch pin member in said one position of said shaft such that rotation of said shaft to a second position causes said groove to release said latch pin member from said engagement with said shaft surface and to engage against and forcibly move said lift pin member to positively open and unseal said first door.

10. The cap assembly of claim 1 wherein said shaft includes a clearance slot between said lift pin member and said groove, which groove does not engage said lift pin member when said first door is in the closed sealed position.

11. The cap assembly of claim 9 wherein said groove moves said lift pin member by a distance of at least 0.13 inches.

12. A cap assembly comprising:
   a first sealing door which pivots between an open position and a closed sealing position;
   first door securing means for securing the first door in the closed sealed position, said first door securing means comprising a shaft surface and a sliding latch pin member operatively associated therewith, said latch pin member being mounted on said first door for sliding movement into and out of engagement with said shaft surface;
   means for releasing said first door securing means to allow movement of said first door to the open position; and
   means for positively opening said first door at least to an unsealed position when said releasing means releases said first door securing means, and first door opening means comprising a lift pin member separate from said latch pin member and mounted on said first door for engagement by said shaft surface for positively opening of said first door.

13. A cap assembly comprising:
   a first sealing door which pivots between an open position and a closed sealed position;
   first door securing means for securing the first door in the closed sealed position, said first door securing means comprising a shaft with a first shaft surface and a latching means extending between said first door and said first shaft surface,
   means for releasing said first door securing means to allow movement of said first door to the open position;
   means separate from said securing means for positively opening said first door at least to an unsealed position when said releasing means releases said first door securing means, said first door opening mans comprising lifting means connected to said first door and extending beyond an edge of said door; and
   a second shaft surface on said first door securing means shaft, said second shaft surface being separate from said first shaft surface and operatively engageable with said lifting means such that rotation of said shaft causes said first shaft surface to release said latching means and said second shaft surface to engage against and forcibly move said lifting means to positively open and unseal said first door.

14. The cap assembly of claim 13 wherein said edge of the first door, beyond which said lifting means extends, is a sealing edge for engaging against a sealing surface of an opening in which said first door pivots between said opened and closed sealed positions.

15. A cap assembly comprising:
   a first sealing door which pivots between an open position and a closed sealed position where said door closes a space with one side of said door in communication with and facing said space and an opposite side of said door facing away from said space and out of communication with said space;
   first door securing means for securing the first door in the closed sealed position, said first door securing means comprising a shaft with a first shaft surface and a latching means extending between said first door and said first shaft surface,
   means for releasing said first door securing means to allow movement of said first door to the open position;
   means separate from said securing mans for positively opening said first door at least to an unsealed position when said releasing means releases said first door securing means, said first door opening means comprising a lifting means connected to said first door; and
   a second shaft surface located on said first door securing means shaft, said second shaft surface being separate from said first shaft surface and operatively engageable with said lifting means such that rotation of said shaft causes said first shaft surface to release said latching means and said second shaft surface to engage against and forcibly move said lifting means to positively open and unseal said first door.

16. The cap assembly of claim 15 wherein said lift means is connected to said first door on said opposite side thereof.

* * * * *

UNITED STATES PATENT AND TRADEMARK OFFICE
CERTIFICATE OF CORRECTION

PATENT NO. : 5,246,131
DATED : September 21, 1993
INVENTOR(S) : James R. Shaw

It is certified that error appears in the above-indentified patent and that said Letters Patent is hereby corrected as shown below:

Column 2, line 49, "mans" should be --means--.

Column 5, line 36, "mans" should be --means--.

Signed and Sealed this

Twenty-ninth Day of March, 1994

Attest:

BRUCE LEHMAN

*Attesting Officer*     *Commissioner of Patents and Trademarks*